(12) United States Patent
Maksimovic et al.

(10) Patent No.: US 8,319,486 B2
(45) Date of Patent: Nov. 27, 2012

(54) METHOD, APPARATUS AND SYSTEM FOR EXTENDED SWITCHED-MODE CONTROLLER

(75) Inventors: Dragan Maksimovic, Boulder, CO (US); Vahid Yousefzadeh, Boulder, CO (US); Eduard Alarcon, Barcelona (ES)

(73) Assignee: The Regents of the University of Colorado, Boulder, CO (US)

( * ) Notice: Subject to any disclaimer, the term of this patent is extended or adjusted under 35 U.S.C. 154(b) by 1171 days.

(21) Appl. No.: 12/139,340

(22) Filed: Jun. 13, 2008

(65) Prior Publication Data

US 2009/0310385 A1 Dec. 17, 2009

(51) Int. Cl.
*G05F 1/00* (2006.01)
(52) U.S. Cl. ........................................ 323/283
(58) Field of Classification Search .................. 323/222, 323/224, 282, 283, 284
See application file for complete search history.

(56) References Cited

U.S. PATENT DOCUMENTS

| | | | | |
|---|---|---|---|---|
| 7,098,641 | B2 * | 8/2006 | King ............................ | 323/283 |
| 7,157,888 | B2 * | 1/2007 | Chen et al. .................... | 323/224 |
| 7,521,907 | B2 * | 4/2009 | Cervera et al. ................ | 323/268 |
| 7,521,913 | B2 * | 4/2009 | Tang et al. .................... | 323/283 |
| 2007/0108953 | A1 * | 5/2007 | Latham ......................... | 323/283 |
| 2008/0258701 | A1 * | 10/2008 | Liu et al. ...................... | 323/328 |

* cited by examiner

*Primary Examiner* — Adolf Berhane
*Assistant Examiner* — Henry Lee, III
(74) *Attorney, Agent, or Firm* — Snell & Wilmer L.L.P.

(57) ABSTRACT

An exemplary extended switched-mode controller is provided for controlling the switching of a switched-mode power converter. This exemplary extended switched-mode controller further comprises a standard switched-mode controller and an auxiliary controller configured to receive standard switch control signals from the switched-mode controller and to (1) pass the standard switch control signals to the switched-mode power converter during non-transient operation, and (2) provide auxiliary switch control signals to the switched-mode power converter during transient operation instead of the standard switch control signals. The auxiliary controller is further configured to determine when to provide the auxiliary switch control signals and to determine what control signals to provide at least partially based on an auxiliary feedback input signal comprising at least one of: sensed converter voltages, converter currents, and an error signal. Where the error signal is at least partially based on the difference between a feedback signal and a reference signal.

28 Claims, 14 Drawing Sheets

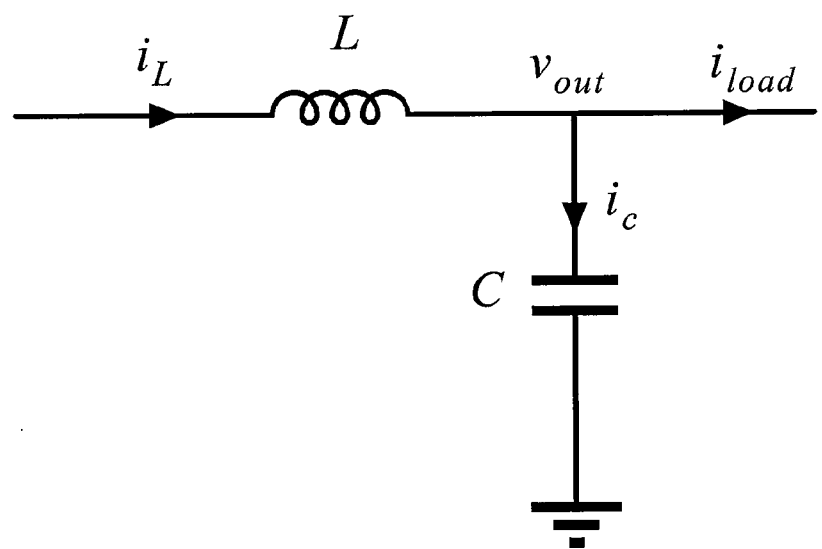
FIG 4D. LC filter in a switched-mode power converter

METHOD, APPARATUS AND SYSTEM FOR EXTENDED SWITCHED-MODE CONTROLLER

FIELD OF INVENTION

The present invention relates generally to switched-mode power converters and, in particular, to power regulation systems, devices, and methods suitable for improving large-signal dynamic responses of closed-loop switched-mode power converters, while preserving precise regulation and wide small-signal stability margins achieved by standard switched-mode controllers.

BACKGROUND OF THE INVENTION

Switched-mode power converters include direct current ("DC")-DC, DC-alternating current ("AC"), AC-DC, and AC-AC configurations. DC-DC switched-mode power converters are often used to provide regulated power to electrical loads in, for example, microelectronic devices. Prior art voltage regulators are generally configured to maintain the voltage, supplied to a dynamic load, at a nominal operating load voltage. Typical prior art voltage regulators (e.g., a switching regulator) may be effective in tracking the slow power changes in the dynamic load; however, the voltage regulators may not be able to suitably track fast changes. During operation of a dynamic load, transient power events may occur. If adjustments to such transient events are not rapidly made, the load may experience dips or spikes in the voltage, which may in turn deleteriously affect the performance of the load.

With reference now to FIG. 1, a typical prior art voltage regulator may comprise a switched-mode power converter 100 and a switched-mode controller 120. Switched-mode power converter ("SMPC") 100 may comprise passive components, such as inductors L, capacitors C, or transformers. SMPC 100 may also comprise power semiconductor devices operated as switches, such as transistors $Q_j$ and $Q_k$. These transistors may be controlled by logic-level on/off signals c. SMPC 100 is configured to receive power from a supply voltage $V_g$ at its input, and to provide a regulated voltage signal at its output to a load 110. Typically, the output voltage is sensed and the sensed output voltage $Hv_{out}$ is compared to a reference voltage $V_{ref}$ to generate an error signal $v_e$.

In some prior art SMPC's, tight regulation of the output voltages or currents is accomplished through a feedback mechanism comprising a switched-mode controller 120. For example, switched-mode controller 120 is configured to receive the error signal $v_e$ and generate one or more logic level control signals c that determine the on/off states of the power semiconductor switches.

Many well-known techniques are available to design and construct switched-mode controllers. For example, in a constant-frequency pulse-width modulation (PWM) controller, the switch control signals have constant frequency equal to the switching frequency, while the signal duty ratio or phase is adjusted to regulate the output voltage. Other well-known approaches include current-mode controllers, hysteretic controllers, sliding-mode controllers, controllers based on pulse-frequency modulation, or controllers based on a combination of these techniques. Switched-mode controllers can be realized using analog, digital or mixed signal circuits.

Unfortunately, although many of these techniques are able to achieve precise and tight regulation in steady state operation, dynamic responses to large-signal disturbances are often significantly worse than desired. These large-signal disturbances may arise due to fluctuations in input power or load disturbances. Moreover, in digital controller implementations, dynamic responses are further affected by delays in the control loop, and by quantization effects due to finite resolutions of analog-to-digital (A/D) converters, digital pulse-width modulators, and internal computations. Thus, typical prior art switched-mode power regulator (converter/controller) systems often do not achieve desired stability and precise regulation under transient conditions. Therefore, there is a need to improve large-signal dynamic response of closed-loop switched-mode power regulators, while preserving precise regulation and wide small-signal stability margins achieved by standard switched-mode regulators.

SUMMARY OF THE INVENTION

In accordance with an exemplary embodiment of the present invention, an extended switched-mode controller is provided for controlling the switching of a switched-mode power converter during both non-transient and transient events. This exemplary extended switched-mode controller comprises a comparator configured to receive a feedback signal from the output of the switched-mode power converter and to receive a reference signal; wherein the comparator is further configured to generate an error signal based at least in part on the difference between the feedback signal and the reference signal. This exemplary extended switched-mode controller further comprises a switched-mode controller configured to determine and generate standard switch control signals for the switched-mode power converter; and an auxiliary controller configured to receive the standard switch control signals from the switched-mode controller and to (1) pass the standard switch control signals to the switched-mode power converter during non-transient operation, and (2) provide auxiliary switch control signals to the switched-mode power converter during transient operation instead of the standard switch control signals. In an exemplary embodiment, the auxiliary controller is further configured to determine when to provide the auxiliary switch control signals and to determine what control signals to provide based at least in part on an auxiliary feedback input signal comprising at least one of: sensed converter voltages, converter currents, and the error signal.

In accordance with another exemplary embodiment, an auxiliary controller is disclosed that is configured for association with a standard switched-mode controller for controlling the switching of a switched-mode power converter during both non-transient and transient events, wherein the switched-mode power converter comprises at least one switch and at least one filter, and wherein the at least one filter comprises an inductor and an output capacitor. In this embodiment, the auxiliary controller comprises: (1) a standard control signal input configured to receive standard switch controls signals from the standard switched-mode controller; (2) an auxiliary feedback input configured to receive an auxiliary feedback input signal comprising at least one of: sensed converter voltages, converter currents, and an error signal; and (3) a switch control signal output configured to provide switch control signals to the switched-mode power converter, wherein the auxiliary controller is configured to receive the standard switch control signals from the standard switched-mode controller and based upon the auxiliary feedback input signal to (A) pass the standard switch control signals to the switched-mode power converter during non-transient mode operation, and (B) provide auxiliary switch control signals to the switched-mode power converter during transient mode operation instead of the standard switch control signals. The auxiliary controller is further configured to determine when to provide the auxiliary switch control signals and to determine what control signals to provide based at least in part on the auxiliary feedback input signal.

In accordance with another exemplary embodiment, a method for regulating voltage to a variable load comprises the step of providing standard control signals to the switched-mode power converter during non-transient operation of the switched-mode power converter, wherein the standard control signals are based on feedback from the output of the switched-mode power converter, and wherein the standard control signals are derived based on at least one of the following types of controllers: constant-frequency pulse-width modulation (PWM) controller, current-mode controller, hysteretic controller, sliding-mode controller, a controller based on pulse-frequency modulation, and a controller utilizing a combination of these techniques. The method further comprises the step of overriding the standard control signals with auxiliary control signals during a transient event, wherein the determination of when to perform the overriding and wherein the determination of the values of the auxiliary control signals are based at least in part on an auxiliary feedback input signal comprising at least one of: sensed converter voltages, converter currents, and the error signal.

BRIEF DESCRIPTION OF THE DRAWING

These and other features, aspects and advantages of the present invention may be better understood with reference to the following description, appended claims, and accompanying figures where:

FIG. 4D illustrates an exemplary filter circuit commonly found in switched-mode power converters;

DETAILED DESCRIPTION

The present invention relates to a power regulation system suitable for providing regulated power to, for example, a microelectronic device such as a microprocessor. In accordance with various exemplary embodiments of the present invention, the power regulation system and method of the present invention are configured to facilitate improved large-signal dynamic responses of closed-loop switched-mode power converters, while preserving precise regulation and wide small-signal stability margins achieved by standard switched-mode controllers. In accordance with various exemplary embodiments of the present invention, the system and method comprise added functionality in the form of an auxiliary controller that is configured to pass the standard control signals from a standard switched-mode controller during non-transient states, and to provide one or more control signals in place of the standard control signals during a transient state.

Figure 1:
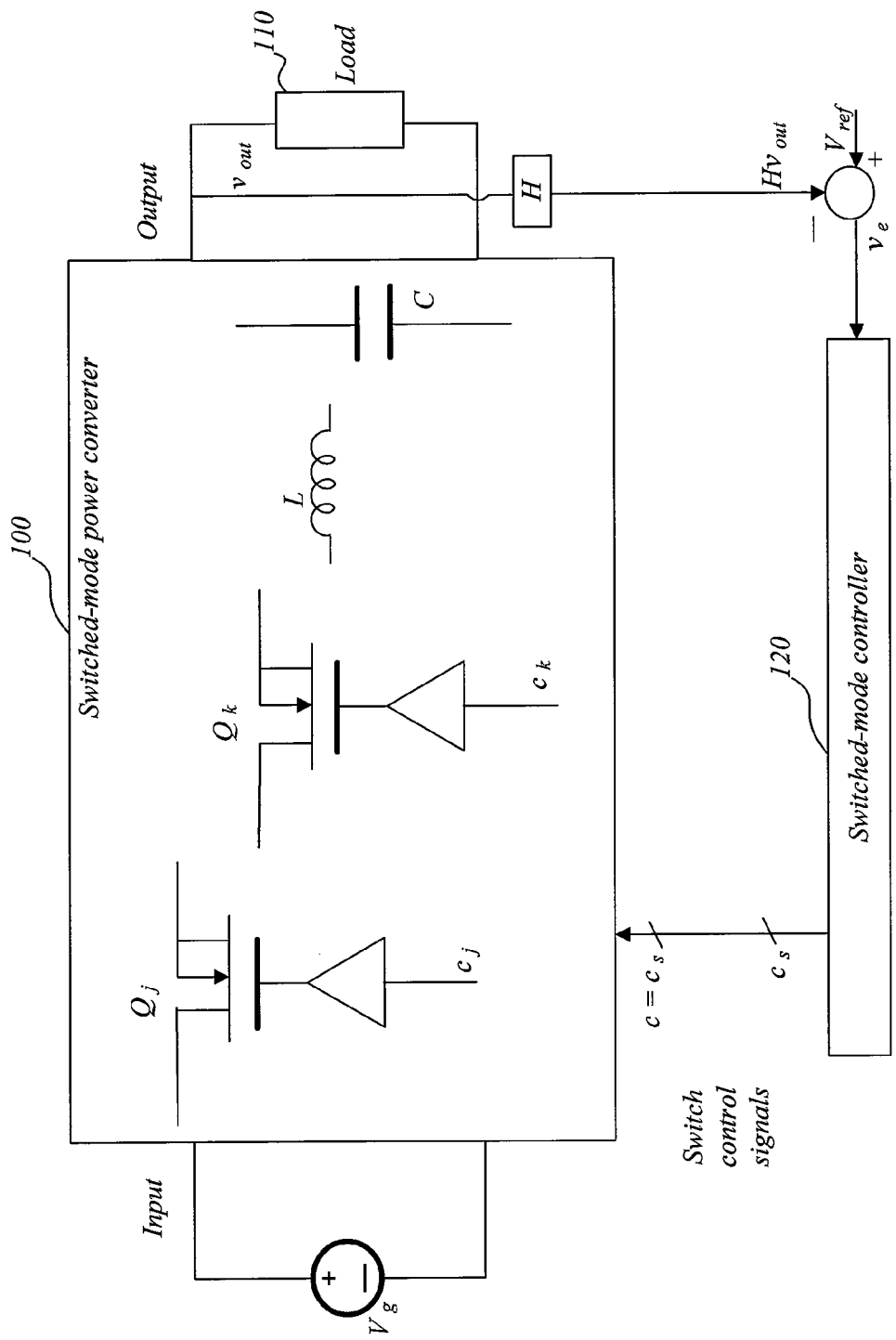
FIG. 1 illustrates a prior art switched-mode power regulator.
Figure 2:
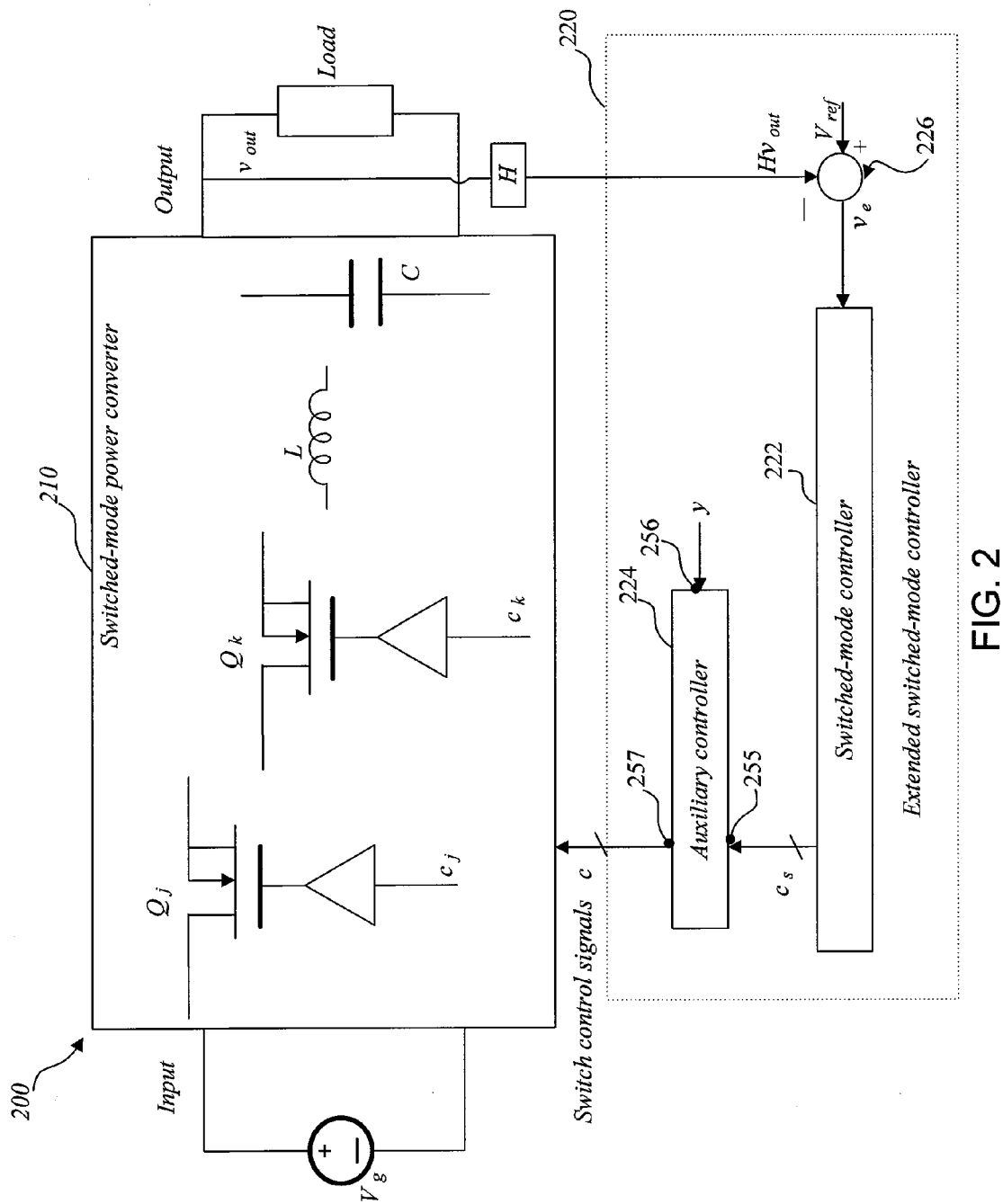
FIG. 2 illustrates, in block format, an exemplary power regulation system, including an extended switched-mode controller in accordance with an exemplary embodiment of the present invention.

With reference now to FIG. 2, and in accordance with an exemplary embodiment of the present invention, a power regulator 200 comprises a switched-mode power converter 210 and an extended switched-mode controller 220. In one exemplary embodiment, extended switched-mode controller 220 comprises a switched-mode controller 222 and an auxiliary controller 224.

In an exemplary embodiment, extended switched-mode controller 220 is electrically connected to the output of switched-mode power converter 210 and to a control signal input of switched-mode power converter 210. For example, extended switched-mode controller 220 is configured to receive an output signal $Hv_{out}$ from the output of switched-mode power converter 210 and to provide switch control signals c to the control signal input of switched-mode power converter 210. In a further exemplary embodiment, extended switched-mode controller 220 is configured to achieve desired stability and precise regulation under transient conditions and improve large-signal dynamic response of the switched-mode power converter 210, while preserving precise regulation and wide small-signal stability margins achieved by standard switched-mode controllers.

In accordance with an exemplary embodiment of the present invention, switched-mode power converter 210 comprises one or more switches, inductors, capacitors, and/or transformers. The switches may, for example, be implemented as power semiconductor devices operated as switches controlled by logic-level on/off signals c. The inductor(s) and capacitor(s) may, for example, be configured as filters. Various types of switched-mode power converters are known and may be used in exemplary embodiments of the invention. For example switched-mode power converter 210 may comprise a DC-DC power converter. In accordance with various aspects of the invention, switched-mode power converter 210 may comprise a synchronous buck converter, a buck converter with a diode rectifier, an isolated half-bridge, full-bridge, push-pull or phase-shifted converter, a Cuk converter, and/or the like.

In accordance with a further exemplary embodiment, and with momentary reference to FIG. 4, the converter may comprise a synchronous buck converter 410. As illustrated, a synchronous buck converter 410 may comprise two transistors $Q_1$ and $Q_2$ where the gates of the transistors are controlled via control signals $c_1$ and $c_2$. The converter 410 receives a power input signal at input 401 connected to the drain of transistor $Q_1$. The source of $Q_2$ is connected to ground. The source of $Q_1$ and the drain of $Q_2$ are connected to one end of the inductor L. The other end of inductor L is connected to ground across a capacitor C. In this exemplary embodiment, the inductor/capacitor arrangement function as a filter. The output of that filter is the output of synchronous buck converter 410. The output of converter 410 is connected to a load. Thus, synchronous buck converter 410 is configured to receive a power input signal and provide a well regulated output voltage to a load.

In accordance with an exemplary embodiment of the present invention, and with reference again to FIG. 2, extended switched-mode controller 220 comprises a comparator 226, a switched-mode controller 222 and an auxiliary controller 224. The output of comparator 226 is electrically connected to the input of switched-mode controller 222, and the output of controller 222 is electrically connected to the input of auxiliary controller 224. The extended switched-mode controller 220 may also be referred to herein as a proximate time-optimal digital (PTOD) controller.

In an exemplary embodiment, comparator 226 comprises a voltage comparator, a differential amplifier, or an analog-to-digital converter. Furthermore, comparator 226 may comprise any standard comparator. For example, comparator 226 may be any device configured to receive an output signal from the output of switched-mode power converter 210, receive a reference signal, and output an error signal representing the difference between the output signal and the reference signal.

In one exemplary embodiment the output signal is the output voltage $v_{out}$ at the output of switched-mode power converter 210. Furthermore, the reference signal may be a reference voltage $V_{ref}$, and the error signal may be the voltage error signal $v_e$, representing the difference between $v_{out}$ and $V_{ref}$. In accordance with other exemplary embodiments, the output signal may comprise an output current, an inductor current, a converter input voltage or a converter capacitor voltage. Thus, comparator 226 may be any suitable comparator configured to generate an error signal for switched-mode controller 222.

In accordance with an exemplary embodiment, controller 222 is a constant-frequency pulse-width modulation (PWM) controller. Controller 222 may, for example, be further configured such that the switch control signals have a constant frequency (equal to the switching frequency), while the signal duty ratio or phase is adjusted to regulate the output voltage. In another exemplary embodiment, controller 222 is one of: a current-mode controller, a hysteretic controller, a sliding-mode controller, a controller based on pulse-frequency modulation, or a controller utilizing other techniques and/or a combination of these techniques. Thus, controller 222 may comprise any suitable switched-mode controller that is configured to provide switch control signals to switched-mode power converter 210. Stated another way, switched-mode controller 222 may comprise any standard switched-mode controller now known, or hereafter developed. In accordance with another exemplary embodiment, switched-mode controller 222 is implemented using analog, digital or mixed signal circuits.

Switched-mode controller 222 is configured to, for example, receive an error signal $v_e$ and generate logic level control signals $c_s$ related to (at least during normal non-transient operation mode) the on/off states of the power semiconductor switches in switched-mode power converter 210. As stated before, switched-mode controller 222 may be able to achieve precise and tight regulation in steady state operation; however, by itself it may not perform satisfactorily in response to dynamic, large-signal disturbances.

In accordance with one exemplary embodiment of the present invention, auxiliary controller 224 comprises a standard control signal $c_s$ input 255, an auxiliary feedback signal y input 256, and a switch control signal output 257. Auxiliary controller 224 is configured to receive standard control signals $c_s$ from switched-mode controller 222 at standard control signal $c_s$ input 255. Auxiliary controller 224 is further configured to receive auxiliary feedback input signals y at auxiliary feedback input 256.

Furthermore, in an exemplary embodiment, auxiliary controller 224 is configured to provide switch control signals c at switch control signal output 257. The switch control signals c either comprise the standard switch control signals $c_s$, or comprise one or more substitute signals. In a "standard" state, or non-transient/steady state, auxiliary controller 224 is configured to pass the standard control signals $c_s$ to the switched-mode power converter 210. Thus, in non-transient state operation, $c=c_s$.

In a transient state, however, at least one of the switch control signals c is determined by the auxiliary controller. The determination of when to change from steady state operation to transient state operation, and the determination of what the control signal c should be is based (at least in part or wholly) upon the feedback input signal(s) y. In an exemplary embodiment, the auxiliary feedback input signals y may comprise one or more of sensed converter voltages, converter currents, or the error signal $v_e$.

Figure 3:
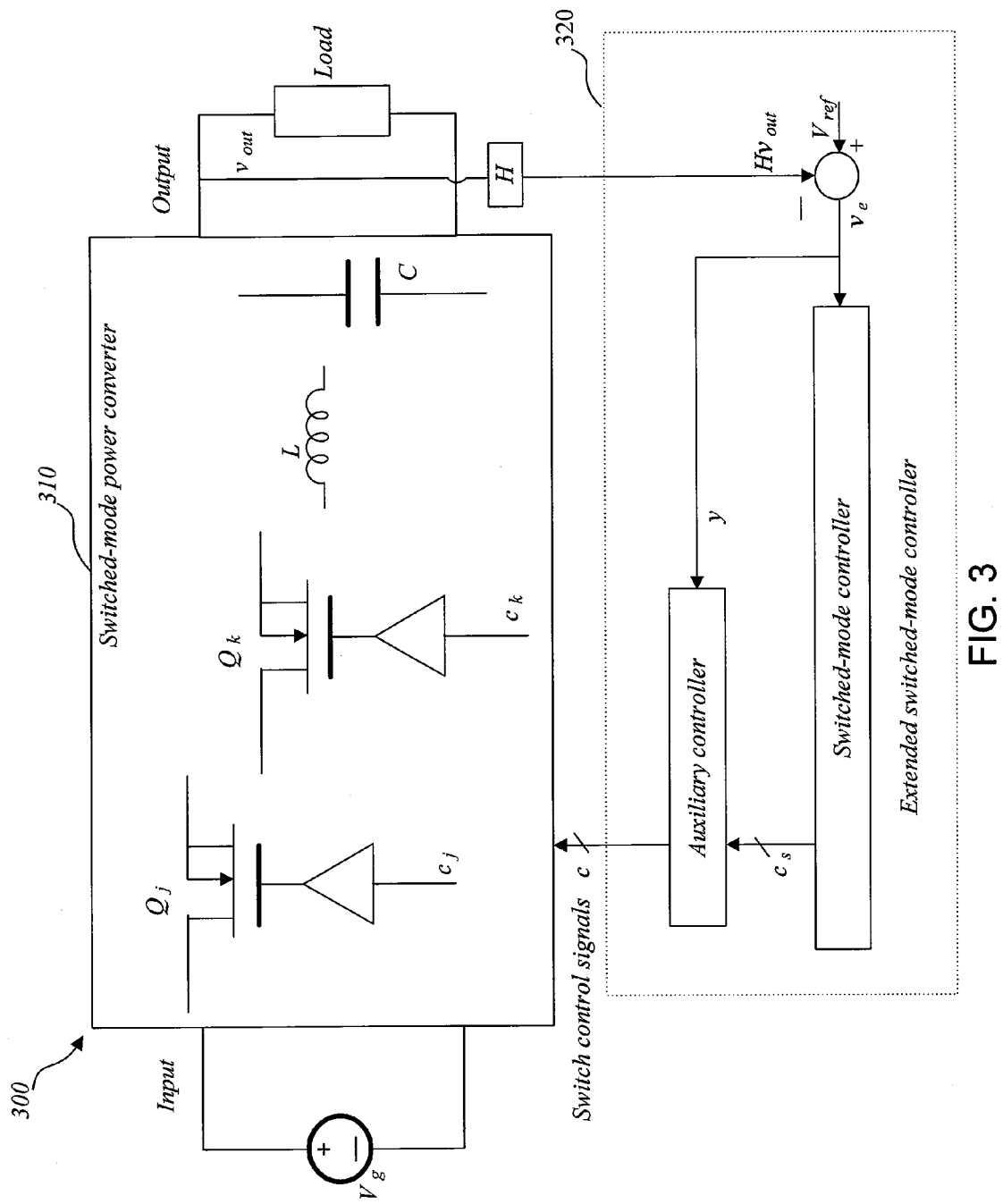
FIG. 3 illustrates, in block format, another exemplary power regulation system, including an extended switched-mode controller in accordance with an exemplary embodiment of the present invention.

For example, and with reference to FIG. 3, a switched-mode converter 310 is controlled by an extended switched-mode controller 320 configured similar to that described with reference to FIG. 2, and where the auxiliary input control signal y is the error signal $v_e$. In this exemplary embodiment, and as described in greater detail herein, the condition for switching between the standard and transient states is based on samples of the error signal $v_e$, and estimates of the capacitor current $i_c$ obtained through a hybrid capacitor current estimation method. In this exemplary embodiment, during transient events, the switch control signals c are set by the auxiliary controller to achieve fast return to regulation. The exemplary extended switched-mode controller 320 can be configured to facilitate very fast, near time-optimal responses to large-signal step load transients. In this exemplary embodiment, the auxiliary controller is entirely digital; for example, the auxiliary controller is a simple state machine coded in Verilog HDL, and parameters of the auxiliary controller are programmable. Furthermore, in this example, the standard switched-mode controller is a constant-frequency digital PWM controller.

As discussed above, the error signal $v_e$ may be based on the sensed output signal, i.e., sensed switched-mode power converter output voltages. But it should be understood that the converter voltages could also be sensed at the input to the converter or at a point internal to the converter.

With reference again now to FIG. 4A, the use of an auxiliary controller 424 is illustrated in the context of controlling the switching of a synchronous buck converter. In this exemplary embodiment, the extended switched-mode controller is a combination of a standard constant-frequency PWM controller with linear proportional-integral-derivative (PID) compensator operating near a reference point and a switching surface controller (SSC) operating away from the reference. In this example embodiment, the auxiliary controller is a switching surface controller. As described further herein the exemplary embodiment further facilitates high-performance responses and stability in the presence of arbitrary disturbances and realistic component tolerances. Furthermore, it facilitates precise voltage regulation and constant-frequency steady-state operation.

Figure 4A:
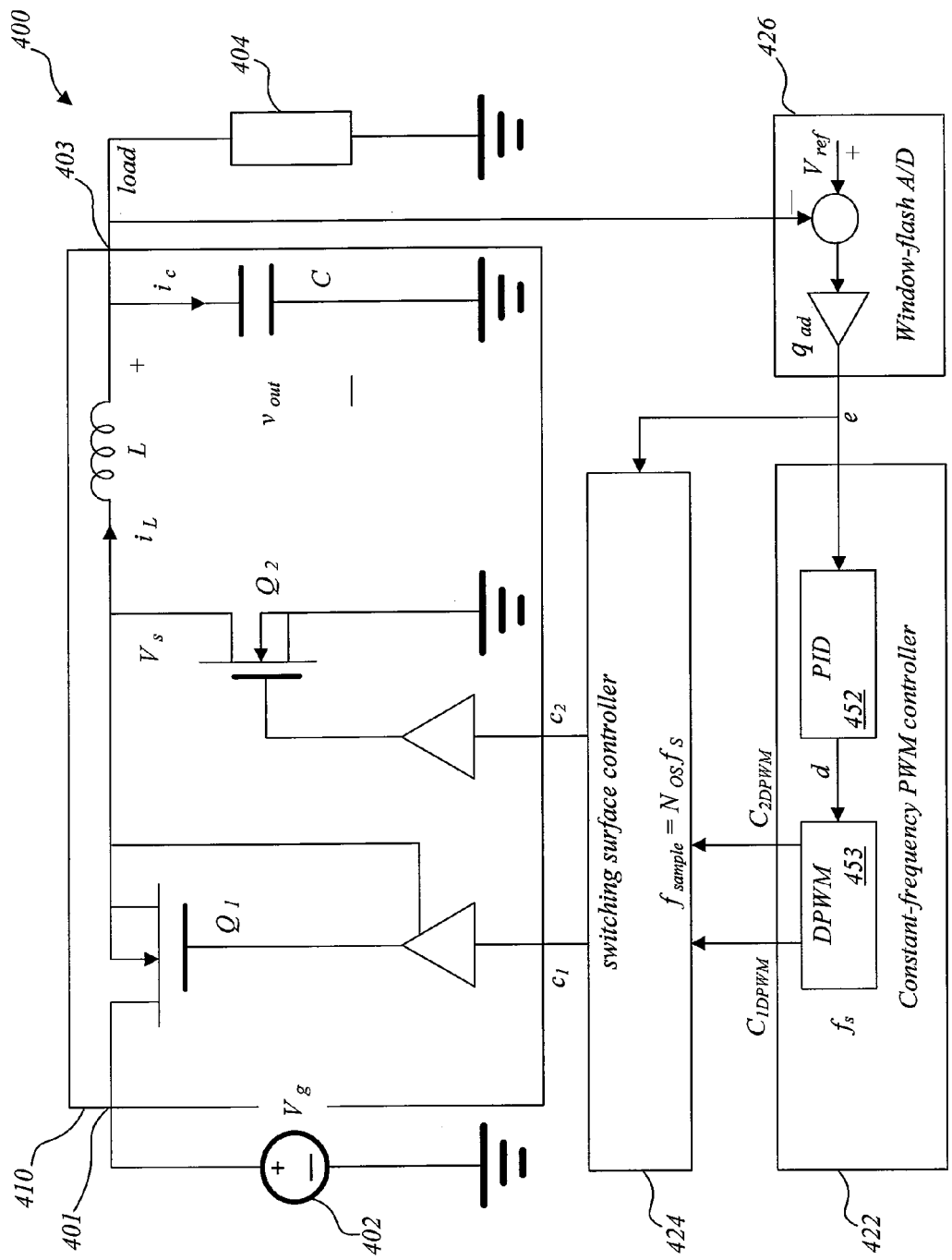
FIG. 4A illustrates, in block format, yet another exemplary power regulation system, including an extended switched-mode controller in accordance with an exemplary embodiment of the present invention.
Figure 4B:
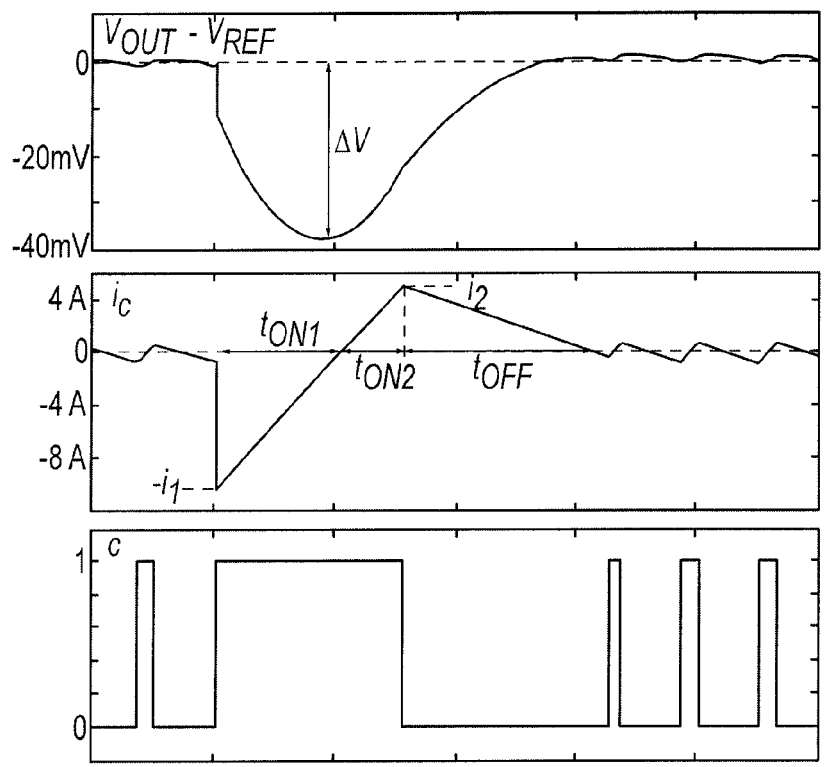
FIGS. 4B and 4C respectively illustrate exemplary waveforms associated with time-optimal step load transient response and examples of corresponding switching surface controller operation in accordance with exemplary embodiments of the present invention.

FIG. 4B illustrates exemplary switched-mode power converter waveforms for a time-optimal response of the exemplary buck converter in FIG. 4A, during a typical step-load transient. Prior to the step-load transient, the converter operates at constant switching frequency, with duty cycle of the control signal c adjusted by a pulse-width modulator in the standard controller so that the output voltage error $v_{out}-V_{ref}$ is approximately zero. Capacitor current $i_c$ is also approximately zero. After an abrupt step in load current, the output voltage dips. In response, the auxiliary controller detects the transient and turns the control signal c to 1 (i.e. on), overriding the control signal from the standard constant-frequency digital PWM controller. This is followed by a time interval when the auxiliary controller turns the control signal c to zero (i.e. off). At the end of this time interval, the output voltage error and the capacitor current return to steady-state (approximately zero) values, and the standard constant-frequency PWM controller resumes normal operation.

Figure 4C:
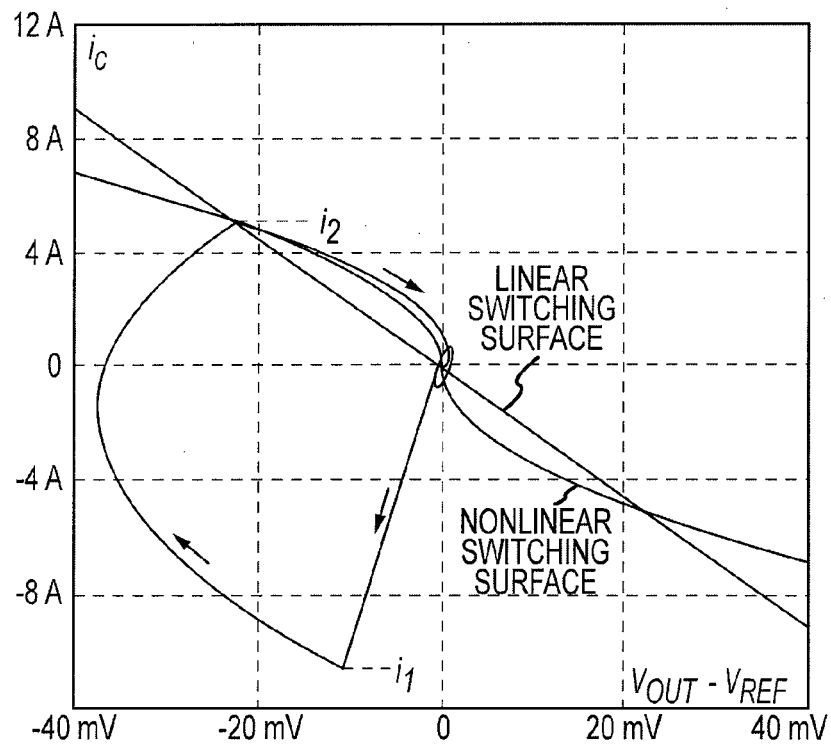
Figure 4E:
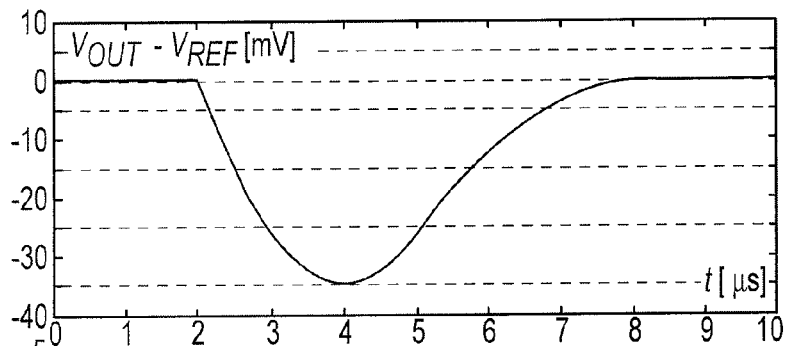
FIGS. 4E, 4F, 4G, 4H and 4I illustrate exemplary waveforms associated with capacitor current estimation in accordance with an exemplary embodiment of the present invention.

Operation of an exemplary switching surface controller (SSC) as an embodiment of an auxiliary controller can be described with reference to the diagram in FIG. 4C, which illustrates an exemplary trajectory of the converter states corresponding to the step load transient illustrated by the waveforms in FIG. 4B. Starting from steady-state operation (point (0,0)) in the diagram, the trajectory departs abruptly and then returns back toward (0,0) directed by the switch control signal c. The value of c depends on the trajectory crossing a switching surface. As an example, and with reference to FIG. 4C, a linear switching surface a may comprise a linear combination of voltage error $v_{out}-V_{ref}$ and capacitor current $i_c$, $\sigma=(V_{ref}-v_{out})+\lambda i_c=0$, where $\lambda$ is a slope parameter of the switching surface. The exemplary switching surface controller operates as follows: switch control signal c is 1 (i.e. on) if $\sigma>0$, or 0 (i.e. off) if $\sigma<0$. As shown in the example of FIG. 4C, this switching surface controller is capable of realizing time-optimal large-signal transient response, bringing the switched-mode power converter output voltage back to steady-state operation in shortest possible time.

In the above described linear SSC embodiment, where the switching surface is defined by $\sigma(x)=0$, ON to OFF switching may occur at the time the converter state trajectory crosses the switching surface. Here, the switching state, i.e., the switch control signal c is determined to be c=1 if $\sigma(x)<0$, and c=0 if $\sigma(x)>0$.

In this exemplary embodiment, the switching surface is a linear combination of the error signal and the capacitor current. It should be noted, however, that in other exemplary embodiments, the switching surface could be non-linear, based on the square of the current, based on a table look up, and/or the like. One example of a nonlinear switching surface is shown in FIG. 4C.

In accordance with an exemplary embodiment auxiliary controller 224 is configured to sense a voltage error signal and a capacitor current signal. In many practical circuits, it is advantageous to replace capacitor or other current sensing by current estimation.

In accordance with an exemplary embodiment of the present invention, auxiliary controller 224 is configured to determine when to switch from the non-transient mode of operation to the transient mode, and to determine how long to over-ride the standard controller with its own ON and/or OFF control signals. In one exemplary embodiment, this is done via computations and/or look up tables based upon precise real-time inductor current sensing.

In a more preferable embodiment, however, such state transitions are determined without current sensing. For example, in the transient ON/OFF states, a hybrid capacitor current estimator may be employed and the switching surface evaluated.

A hybrid capacitor current estimator is described with reference to an exemplary filter in a switched-mode power converter illustrated in FIG. 4D, and exemplary waveforms illustrated in FIGS. 4E through 4I. In the exemplary embodiment, a voltage error signal is sampled and converted to a digital error signal e using an analog-to-digital (A/D) converter.

For example, with reference, again, to FIG. 4A, converter/controller system 400 comprises a synchronous buck converter 410, a window-flash A/D converter 426, a constant-frequency digital PWM controller 422, and a switching surface controller 424 (i.e., auxiliary controller). Synchronous buck converter 410 is configured to receive power from voltage source 402 at input 401, and to provide output power at output 403 to a load 404.

In accordance with an exemplary embodiment window-flash A/D converter 426 comprises an input and an output, and is configured to determine and output an error signal e based, at least partially, on a sensed voltage received at its input from output 403 of converter 410. In one exemplary embodiment the window-flash A/D converter 426 has a voltage A/D quantization bin size, $q_{A/D}$, Least Significant Bit ("LSB") resolution, and a total of 9 bins around the reference. In one exemplary embodiment, $q_{A/D}=10$ mV.

Figure 4F:
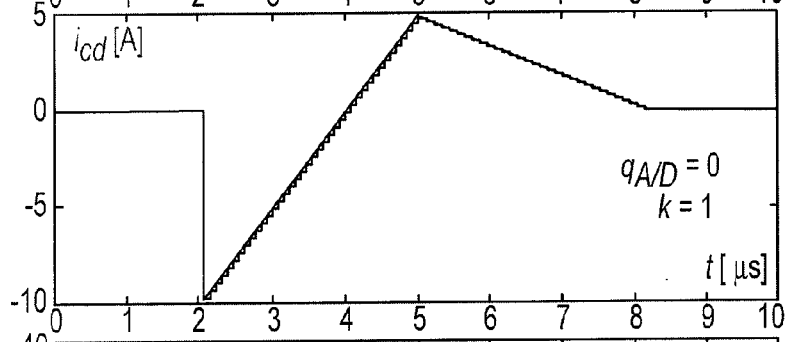

Assuming an ideal A/D converter with $q_{A/D}=0$, a simple capacitor current estimator can be accomplished for example using standard finite difference computation, illustrated by exemplary waveforms of the finite difference capacitor current estimate $i_{cd}$ in FIG. 4F.

$$i_{cd}[n] = -\frac{C}{T_{sample}}(e[n]-e[n-1])$$

Figure 4G:
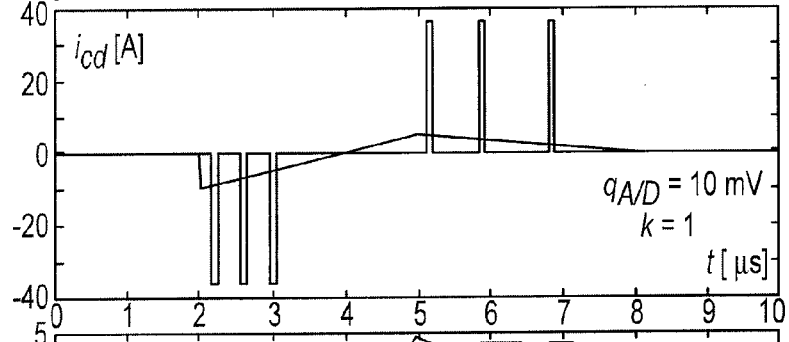
Figure 4H:
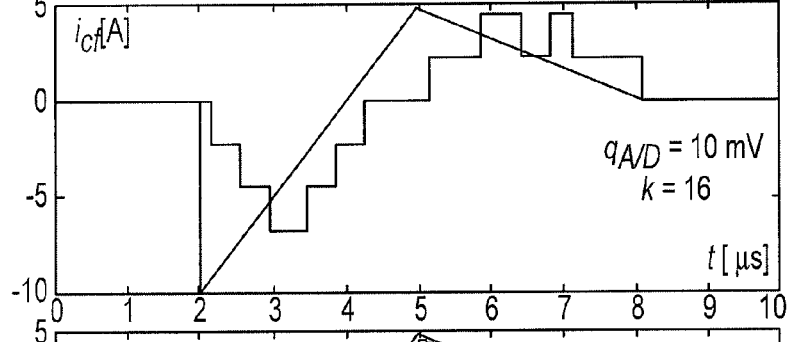

However, this estimator may be highly susceptible to switching noise in the sensed output voltage, and to quantization errors, as illustrated in FIG. 4G for an exemplary $q_{A/D}=10$ mV: the effective resolution in the estimate may be too low. Sampling the output voltage error at a higher rate can partially alleviate the problem using a moving average filter of order k, as illustrated by exemplary waveforms in FIG. 4H showing an improved estimate $i_{cf}$ waveform $$i_{cf}[n] = -\frac{C}{kT_{sample}}(e[n]-e[n-k])$$

Figure 4I:
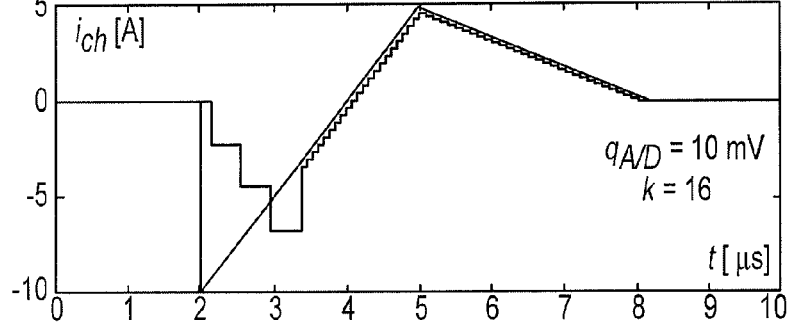

Furthermore, the estimate based on moving average filtering of the finite difference can be used to generate an initial value for a high-resolution hybrid capacitor current estimator $i_{ch}$ illustrated by exemplary waveforms in FIG. 4I. In the exemplary embodiment of the hybrid capacitor estimator, the estimated value is updated based on slopes ($m_1$ or $m_2$) of an inductor current $i_L$ in the exemplary filter of FIG. 4D.

$$i_{ch}[n] = i_{ch}[n-1] + \begin{cases} m_1 T_{sample} & \text{if } c = 1 \\ -m_2 T_{sample} & \text{if } c = 0 \end{cases}$$

FIG. 4I shows an example of the exemplary hybrid estimator performance. Immediately after the step load transient, the hybrid estimator provides a reliable indication of the direction and size of the load change, which is sufficient for the SSC operation when the state trajectory is away from the switching surface. Then, an accurate, high-resolution capacitor current estimate becomes available around the points where the state trajectory is crossing the switching surface.

In an exemplary embodiment, a linear switching surface is given by $\sigma[n] = -e[n] + \lambda i_{ch}[n]$, where $\lambda$ is a slope parameter, $e[n]$ is a sample of the output voltage error, $ich[n]$ is the output of the exemplary hybrid capacitor current estimator, and $\lambda$ is a slope parameter of the switching surface. In one exemplary embodiment, the auxiliary controller slope parameter is selected such that $\lambda C/(kTsample)$ is approximately equal to one, and in this embodiment, the implementation may be made without multipliers or look-up tables.

Although described herein in terms of a simple, linear switching surface, further improvements can be obtained by employing a non-linear switching surface, by adaptive adjustments of control parameters such as selecting the slope of the switching surface based on amplitude of the estimated capacitor current.

The constant-frequency digital PWM controller (standard controller) 422 may further comprise a PID compensator 452 and a digital pulse-width modulator (DPWM) 453. In this exemplary embodiment, controller 422 is a constant-frequency digital PWM controller, and the controller sampling frequency is the same as the converter switching frequency $f_s$.

Switching surface controller (SSC) 424, which is an auxiliary controller in this example embodiment, is configured to take samples of the voltage error e at the oversampling rate $N_{os}f_s$ higher than the switching frequency $f_s$. The SSC may, for example, be implemented as a state machine such as the one discussed with reference to FIG. 6. In this exemplary embodiment, the parameters used were; $V_g = 6.5$ V, L=1 uH, C=288 uF (ceramic), $R_{esr} = 1$ m$\Omega$, $V_{ref} = 1.3$ V, switching frequency $f_s = 780$ kHz, $I_{load} = 0$ to 10 A, and an oversampling rate for the auxiliary controller $N_{os} = 32$, which corresponds to a the 25 MHz system clock.

In accordance with various aspects of the present invention, the switch control signals c are determined by the switching surface controller 424 to facilitate near-time-optimal response to large-signal disturbances. Furthermore, in an exemplary embodiment, once a return to a non-transient state is detected, i.e. when the switched-mode converter 410 returns close to its steady-state operation, standard switch control signals are passed to the converter switches (e.g., Q1 and Q2), and the system 400 returns to standard closed-loop control in steady state. By combining a near time-optimal switching surface controller and a standard controller, it is possible to achieve the favorable properties of both types, namely, fast large-signal transient responses, precise control in steady state, and overall robustness against parameter variations and un-modeled dynamics.

Figure 5A:
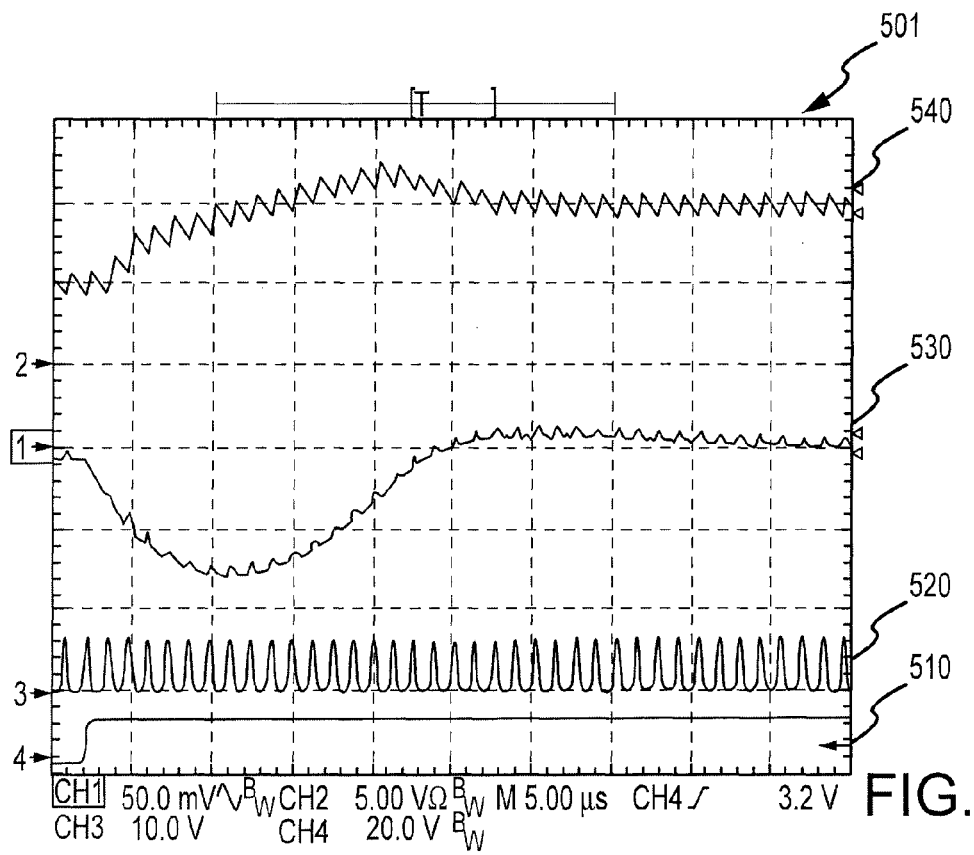
FIG. 5A illustrates exemplary wave forms associated with a 50-100% step load in accordance with a standard prior art controller.
Figure 5B:
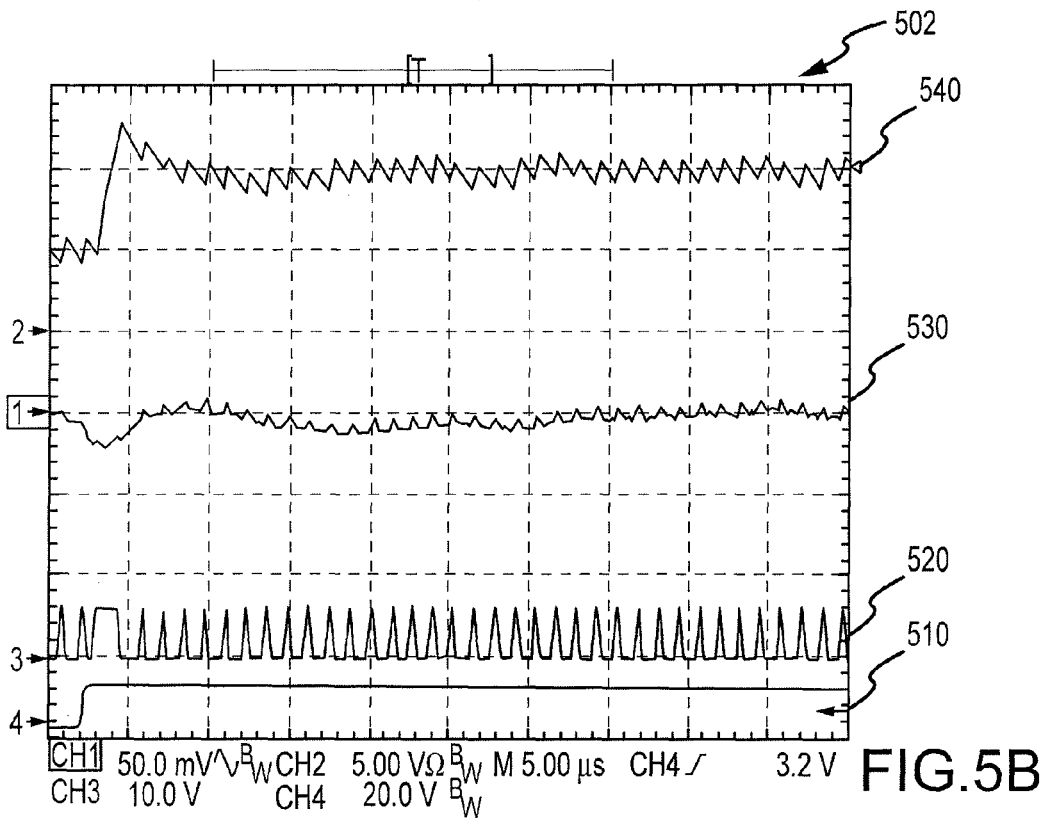
FIG. 5B illustrates exemplary wave forms associated with a 50-100% step load in accordance with an exemplary embodiment of the present invention.

With reference now to FIGS. 5A and 5B, these figures illustrate an experimental step-load (50-100%) transients. In FIG. 5A, a "standard" constant frequency PWM controller with PID compensator is used. In FIG. 5B, an extended switched-mode controller as described herein with reference to FIG. 4A is used. The waveform 510 is the load control signal, which shows the point at which the transient occurred. The waveform 520 represents the switched-node voltage $v_s$(10V/div) showing the on/off state of the switch. The waveform 530 is the AC coupled output voltage $v_{out}$(50 mV/div). The waveform 540 is the inductor current $i_L$ (5 A/div). It should be readily apparent based on looking at these two Figures that use of an exemplary extended switched-mode controller of the present invention improves the speed at which the output voltage returns to steady state, improves the speed at which the output current arrives at its new steady state value, and reduces the size of the voltage dip while in transient state.

Figure 6:
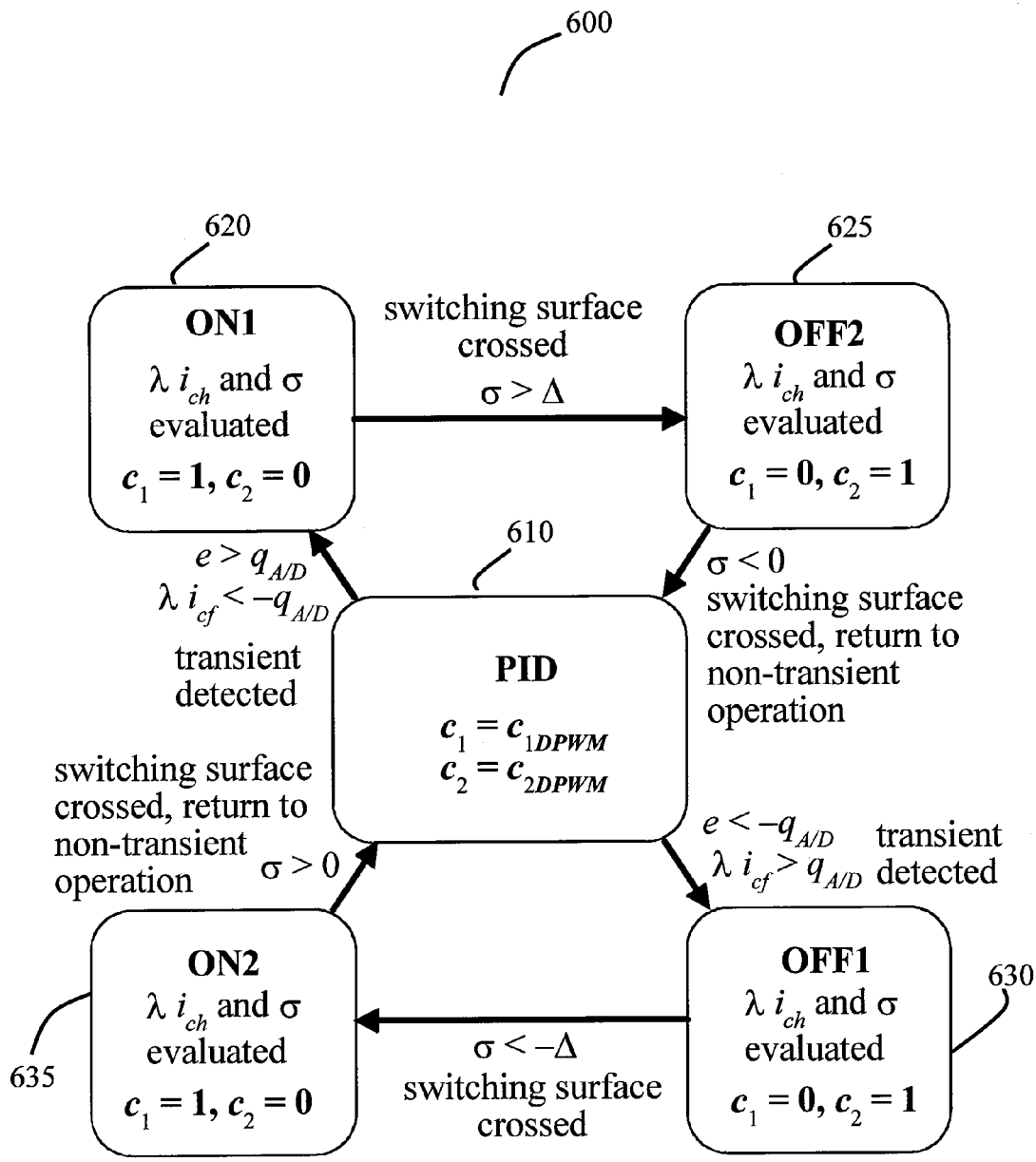
FIG. 6 illustrates an exemplary state machine diagram of a switching surface controller (SSC) in accordance with an exemplary embodiment of the present invention.

With reference now to FIG. 6, in accordance with an exemplary embodiment, the switching surface controller is implemented as a state machine. An exemplary state diagram 600 for this state machine illustrates the workings of this state machine. During non-transient operation, the state machine is at state PID 610. In the PID state, the SSC controller (i.e., auxiliary controller) 424 simply receives the switch control signal(s), $c_{1DPWM}$ and $c_{2DPWM}$, from the PID controller (i.e., standard controller) 422 and passes them to the output of auxiliary controller 424. In other words, $c_1 = c_{1DPWM}$ and $c_2 = c_{2DPWM}$.

In this exemplary embodiment, the controller moves to ON1 (or OFF1), i.e. a transient state, when the voltage error e and the current estimate $i_{cf}$ exceed certain thresholds. In general, if the voltage error is positive then control passes from the non-transient state to ON1. On the other hand, if the voltage error is negative then control passes from the non-transient state to OFF1.

More specifically, in the exemplary state-machine embodiment of the SSC in FIG. 6, when $e > q_{A/D}$ and $\lambda i_{cf} < -q_{A/D}$, then control passes to ON1 620. At state ON1, $c_1$ is set equal to one, $c_1 = 1$, and $c_2$ is set to zero, $c_2 = 0$, thus overriding the control signals from standard controller 422. Control passes to state OFF2 625 once the switching surface is crossed, $\sigma > \Delta$, where $\Delta$ is a threshold parameter. Ideally, $\Delta$ would be zero, but this could result in too rapid transitions of switching states, so $\Delta$ is assigned a value that allows the auxiliary controller (i.e. switching surface controller) additional noise immunity. For example, $\Delta$ may be set equal to a least significant bit of the computed value of the switching surface $\sigma$. In an exemplary embodiment of FIG. 4A, this value equals the least-significant bit (LSB) resolution $q_{A/D}$ of the window-flash A/D converter 426.

At state OFF2, $c_1$ is set equal to zero, $c_1 = 0$, and $c_2$ is set to one, $c_2 = 1$ This is done, for example, to transition back close to non-transient stead-state operating point, i.e. to transition back to the PID state. Thus, in this exemplary embodiment, when a transient starts, the switch is left on for an extended period of time to rapidly ramp up an inductor current, and minimize the dip in the output voltage. Then, to control overshoot, the switch is left off for a period of time to allow inductor current and voltage to settle at the steady state values. Upon the next switching surface crossing, $\sigma < 0$, the state passes back to non-transient PID state 610. In this example, the PID controller 422 never stopped running during this process of moving to states ON1 and OFF2, but the control signals from controller 422 were replaced with other control signals during these states. As a result, smooth controller transitions between non-transient and transient modes are accomplished.

Similarly, when $e < -q_{A/D}$ and $\lambda i_{cf} > q_{A/D}$, then control passes to OFF1 630. At state OFF1, $c_1$ is set equal to zero, $c_1 = 0$, and $c_2$ is set to 1, $c_2 = 1$, thus overriding the control signals from standard controller 422. Control passes to state ON2 635 once the switching surface is crossed, $\sigma < -\Delta$. At state ON2, $c_1$ is set equal to one, $c_1 = 1$, and $c_2$ is set to zero, $c_2 = 0$. This is done to transition back to the non-transient PID state. Thus, in this exemplary embodiment, the switch is left off for an extended period of time to rapidly ramp down the inductor current and minimize the voltage overshoot, and then to control undershoot, the switch is left on for a period of time to allow inductor current and output voltage to settle at the steady state values. When σ>0, then the state passes back to non-transient PID state 610 from state ON2 635. Again, the PID controller 422 never stopped running during this process of moving to states OFF1 and ON2, but the control signals from controller 422 were replaced with other control signals during these states.

Thus, states 630 and 635 are used in the event of a transient indicated by a step down in voltage at the converter output, and states 620 and 625 are used in the event of a transient indicated by a step up in voltage at the converter output.

Auxiliary controller 424 may for example be implemented through hardware and logic devices, through a software routine, through firmware, or as a combination of hardware and software. Furthermore, in one exemplary embodiment, the auxiliary controller hardware or software may be a stand alone device(s) or program(s) configured to work in conjunction with separate controller 222/422 hardware and/or software. In another exemplary embodiment, the hardware or software may be integrated with the hardware/software of controller 222/422.

In one exemplary embodiment, auxiliary controller 224 and/or switched-mode controller 222, and the logic associated therewith, may be formed on a chip or an integrated circuit using well known techniques. In another exemplary embodiment, auxiliary controller 424 is implemented as an additional code module in hardware description language (e.g. Verilog HDL) and added to a standard controller code in order to create an extended mode controller that is used in place of the standard controller. For example, the auxiliary code module may be combined with standard controller code and used to program a field programmable gate array (FPGA) which may perform the functions of auxiliary controller 224 and switched-mode controller 222. In yet another exemplary embodiment, auxiliary controller 424 is coded and programmed in an FPGA. In this exemplary embodiment, the FPGA is connected on a board electrically to a standard controller.

In accordance with an exemplary embodiment of the present invention, the switching surface controller (SSC) comprises a hybrid capacitor current estimator that enables effective switching surface evaluation using relatively low-resolution hardware, and eliminates the need for current sensing. In one exemplary embodiment, the SSC controller state machine is realized in Verilog HDL, and implemented on a Xilinx Virtex IV FPGA development platform with only 386 gates. This very small SSC controller module can, for example, be added to an existing digital PWM controller with no other modifications.

Figure 7A:
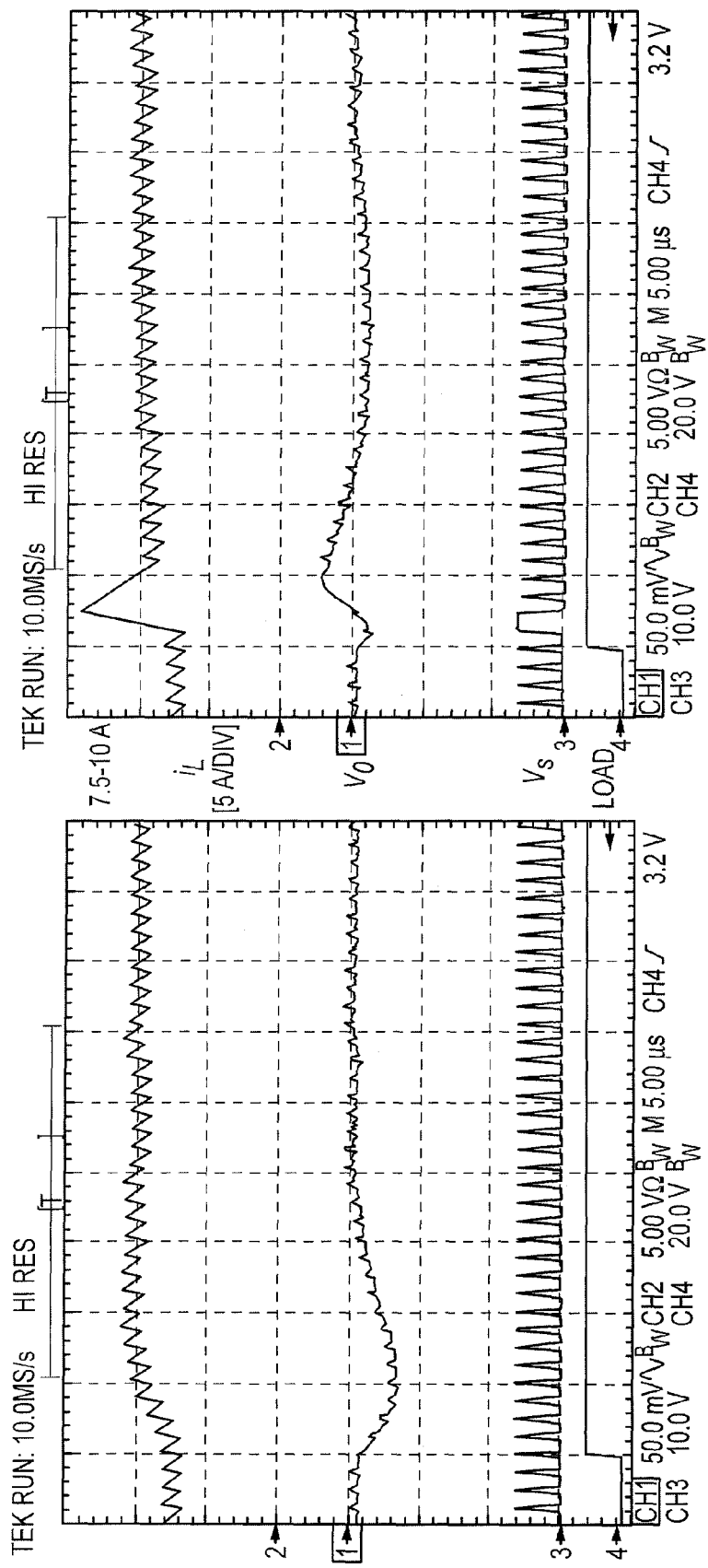
FIG. 7A illustrates exemplary wave forms associated with various step loads, in accordance with a standard prior art controller.
Figure 7B:
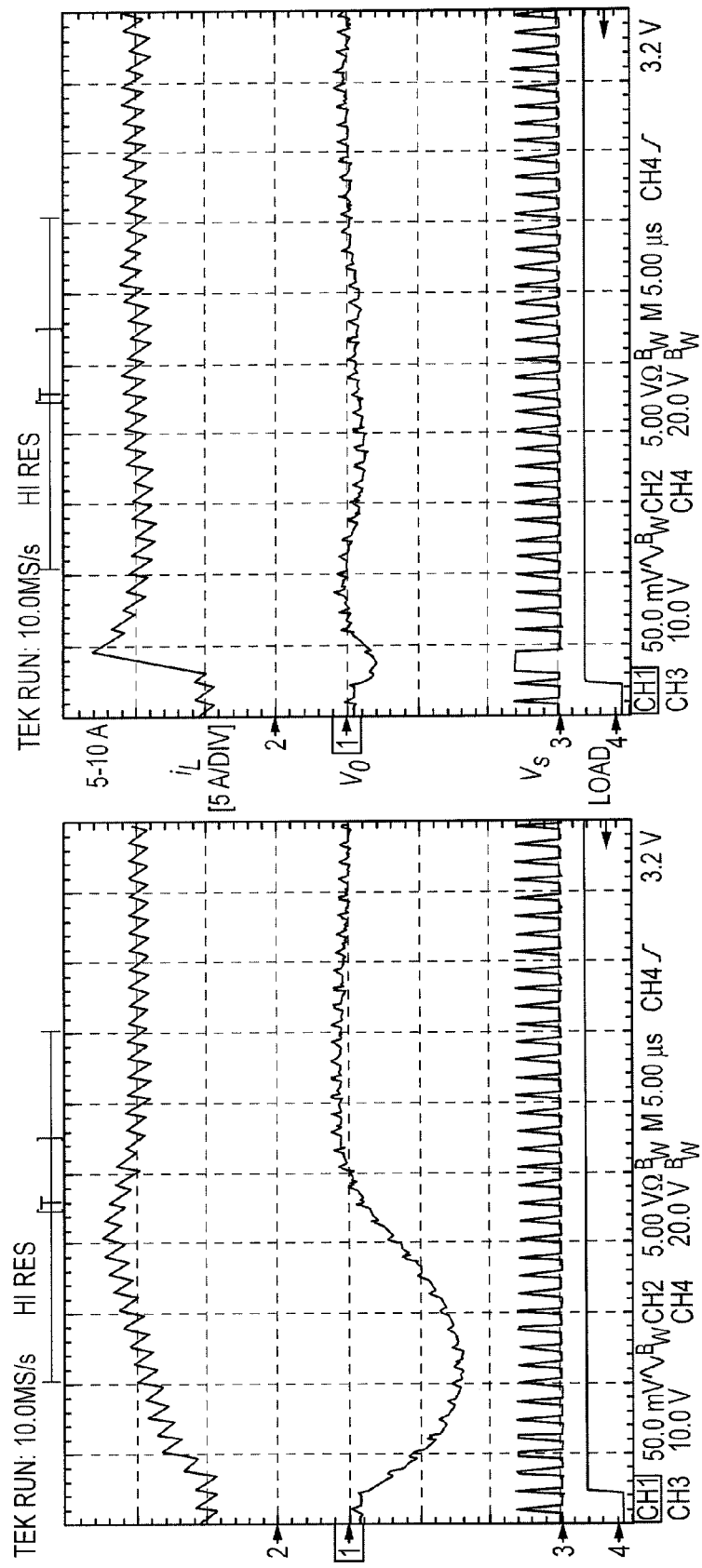
FIGS. 7B and 7C illustrate other exemplary wave forms associated with various step loads, in accordance with an exemplary embodiment of the present invention.
Figure 7C:
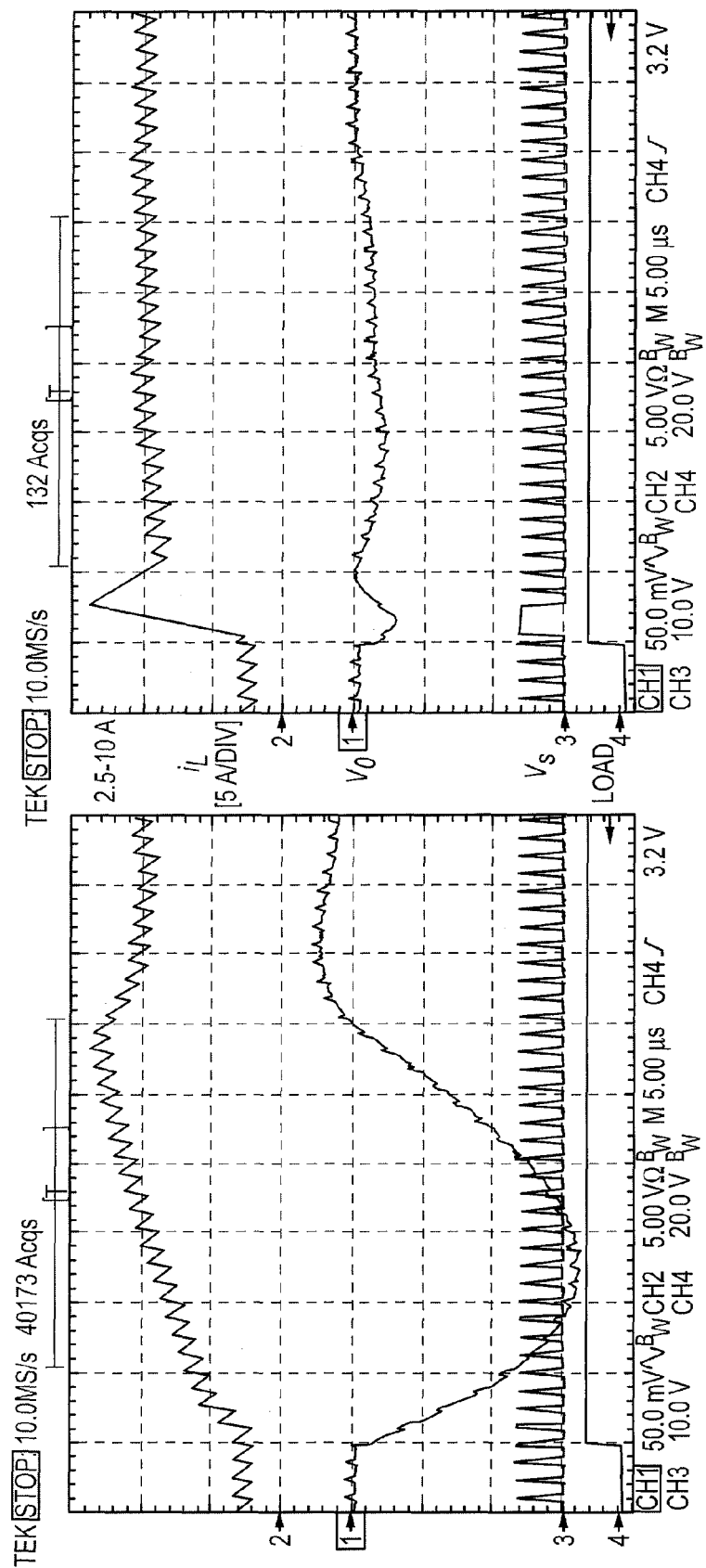

With reference now to FIGS. 7A, 7B, and 7C, the performance of a standard constant frequency digital PWM controller (performed in this test by testing the controller with the SSC module disabled) is compared to the performance of an extended controller (also called proximate time-optimal controller) for three different step-load transients: 75-100%, 50-100%, and 25-100%. Significantly improved step-load transient responses can be observed in all three cases.

Figure 8:
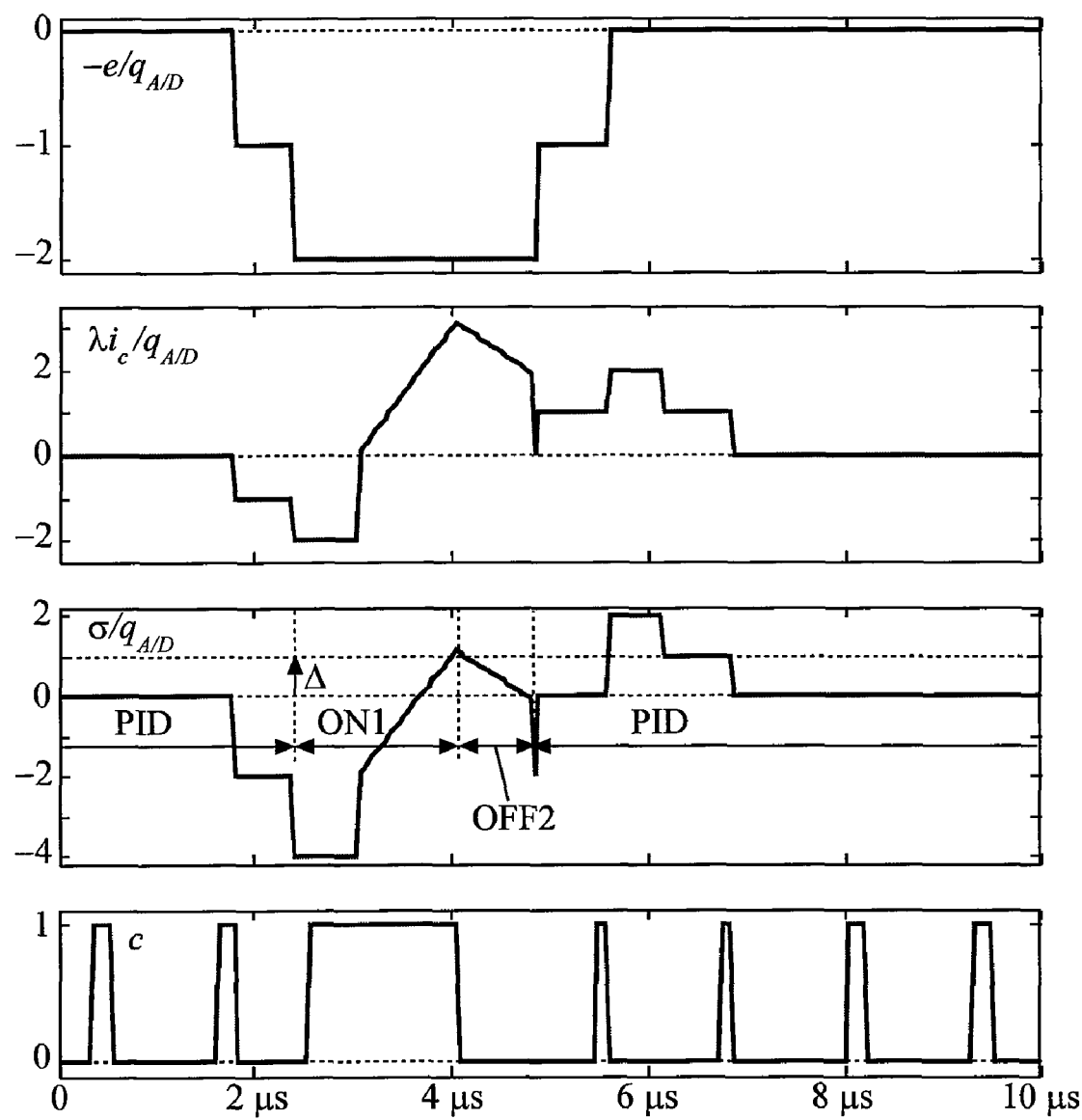
FIG. 8 illustrates additional exemplary wave forms associated with a step load, in accordance with an exemplary embodiment of the present invention.

With reference now to FIG. 8, experimental waveforms are illustrated for the case of a 5-to-10 A step load transient. The controller enters the transient ON1 state when the voltage error e equals $-2q_{A/D}$. In the ON1 state, the switch control signal is on, c=1, and the switching surface σ is evaluated. Transition to the OFF2 state occurs at the time σ crosses the threshold $\Delta = q_{A/D}$. In the OFF2 state, c=0. Finally, upon detection of the zero-crossing of σ, the controller moves back to the non-transient PID state, and the standard constant-frequency PWM controller takes over the task of bringing the output voltage error to the zero-error bin of the A/D converter.

In one exemplary embodiment, auxiliary controller 224 is a digital auxiliary controller. In other exemplary embodiments, however, auxiliary controller 224 is implemented as an analog or mixed signal auxiliary controller.

Auxiliary controller 224 may comprise auxiliary controller parameters. These parameters may include one or more of: slopes of switching surfaces, thresholds for detection of a transient state, thresholds for detection of a non-transient state, parameters of a hybrid capacitor current estimator, and/or the like. These auxiliary control parameters, in one embodiment are constant values. In other exemplary embodiments, these parameters can be programmed, or are values that may be determined by auto-tuning techniques.

Although described herein in connection with a specific state diagram, it should be appreciated that other state diagrams may be used to generate appropriate control signals over-riding the control signals from the standard controller for the purpose of quickly and accurately adjusting to a transient. For example, additional ON and OFF states may be used during a transient (e.g., ON for a first time period, OFF for a second time period, ON again for a third time period, and OFF again for a fourth time period). Moreover, different conditions for the transition between states may be used. In accordance with other exemplary embodiments, the state diagram may be more complex by, for example, incorporating additional states such that one state path is followed for smaller transients and another path is followed for larger transients.

Thus, extended switched-mode controller 220 is configured to receive an output signal, calculate control signals using a standard feedback and switched-mode controller 222, and override those control signals with one or more control signals from an auxiliary controller 224 during transient conditions.

Figure 9:
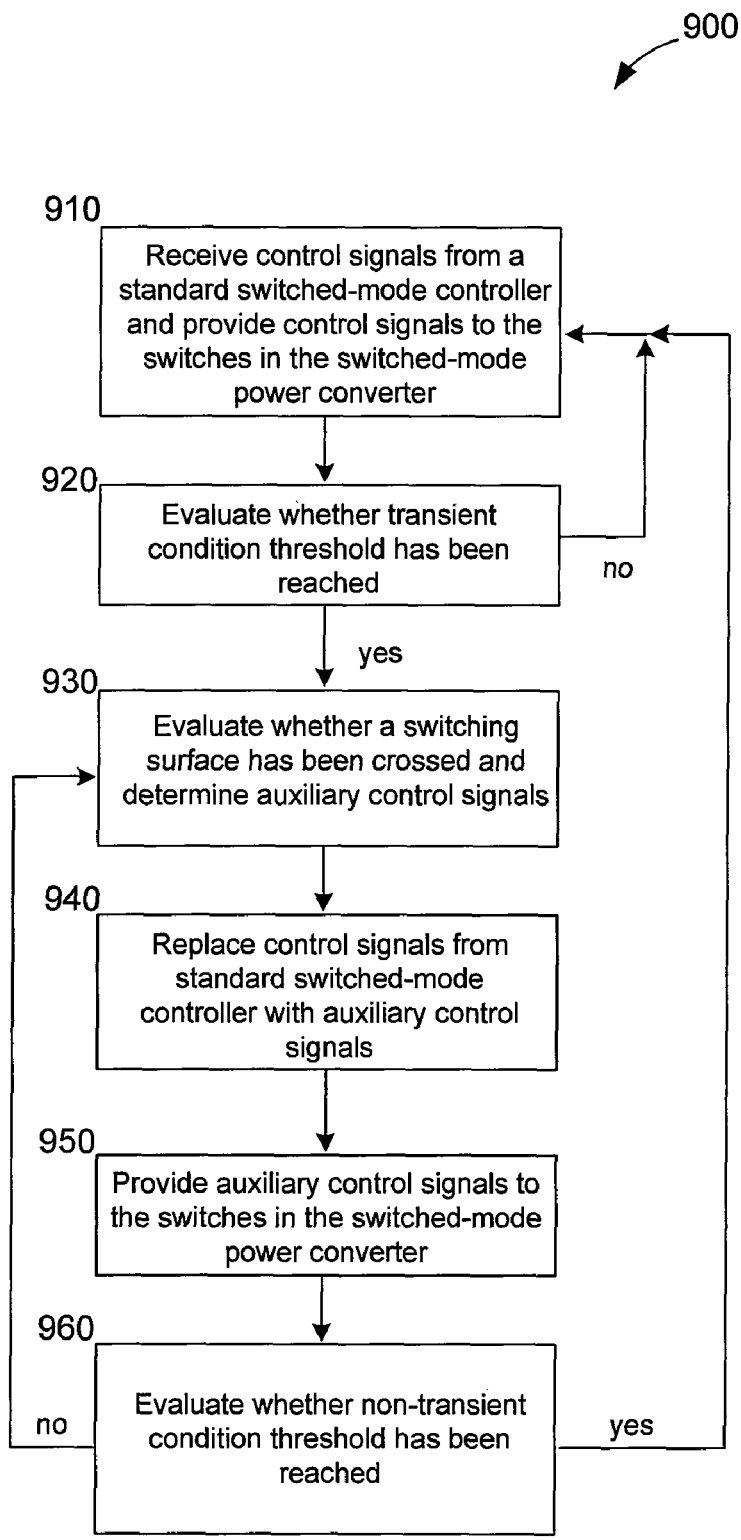
FIG. 9 is an exemplary block diagram illustrating exemplary method steps in accordance with various exemplary aspects of the present invention.

In accordance with an exemplary embodiment of the present invention, and with reference to FIG. 9, a method 900 for controlling a switched-mode power converter comprises the step of receiving control signals from a standard switched-mode controller and providing those control signals to the switches in the switched-mode power converter (Step 910). Stated another way, method 900 comprises the step of passing control signals from a standard switched-mode controller to the switched-mode power converter (Step 910). Method 900 further comprises the step of evaluating whether a transient condition threshold has been reached (Step 920). Unless and until such threshold has been reached, method 900 repeats this process (Steps 910 and 920).

If the transient condition threshold has been reached, method 900 further comprises the steps of evaluating whether a switching surface has been crossed and determining auxiliary control signals (Step 930). The first time this step is executed, switching surface controller 424 determines which side of the switching surface the converter state trajectory is on. In accordance with an exemplary embodiment, the auxiliary control signals are determined to be either c=1 or c=0. This determination could be based on any suitable control technique, but in an exemplary embodiment, this determination is based on whether it was the upper or lower threshold that was crossed. Method 900 further comprises the steps of replacing the control signals from the standard switched-mode controller with the determined auxiliary control signals (Step 940), and providing the auxiliary control signals to the switches in the switched mode power converter (Step 950).

Method 900 further comprises the step of evaluating whether or not a non-transient condition threshold has been reached (Step 960). For example, a threshold can be based on evaluating how close an output voltage error and a capacitor current estimate are to zero. If the non-transient threshold has not been reached, method 900 returns to evaluating whether a switching surface has been crossed and determining auxiliary control signals (Step 930). For example, if the auxiliary control signal(s) were set at 0 before a switching surface is crossed, it may remain at 0 until the switching surface is crossed and after the switching surface is crossed, the control signal(s) may be changed to a 1. In other exemplary embodiments, away from (0,0) the switching surface may be crossed multiple times before the trajectory finally converges to (0,0).

On the other hand, if the non-transient threshold has been reached, method 900 returns to passing the control signals received from a standard switched-mode controller on to the switches in the switched-mode power converter (Step 910).

Furthermore, a method of making an extended controller comprises adding an auxiliary controller (in the form of code or logic arrays or hardware, etc.) to that of a standard controller wherein the auxiliary controller is configured to substitute control signals for the control signals of the standard controller during a transient situation. In another embodiment, a method of making an extended controller comprises connecting an auxiliary controller to a standard controller as described herein.

It should be appreciated that the particular implementations shown and described herein are illustrative of various embodiments of the invention including its best mode, and are not intended to limit the scope of the present invention in any way. Indeed, for the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. Many alternative or additional functional relationships or physical connections may be present in a practical power regulator system.

The present invention has been described above with reference to exemplary embodiments. However, those skilled in the art having read this disclosure will recognize that changes and modifications may be made to the embodiments without departing from the scope of the present invention. These changes or modifications are intended to be included within the scope of the present invention, as expressed in the following claims.

What is claimed is:

1. An extended switched-mode controller for controlling the switching of a switched-mode power converter during both non-transient and transient events, wherein the switched-mode power converter comprises at least one switch and at least one filter, and wherein the at least one filter comprises an inductor and an output capacitor, the extended switched-mode controller comprising:
   a comparator configured to receive a feedback signal from the output of the switched-mode power converter and to receive a reference signal; wherein said comparator is further configured to generate an error signal based at least in part on the difference between said feedback signal and said reference signal;
   a switched-mode controller configured to determine and generate standard switch control signals for the switched-mode power converter based at least in part on said error signal; and
   an auxiliary controller configured to receive said standard switch control signals from said switched-mode controller and to (1) pass said standard switch control signals to the switched-mode power converter during non-transient operation, and (2) provide auxiliary switch control signals to the switched-mode power converter during transient operation instead of said standard switch control signals;
   wherein said auxiliary controller is further configured to determine when to provide said auxiliary switch control signals and to determine what control signals to provide based at least in part on an auxiliary feedback input signal comprising at least one of: sensed converter voltages, converter currents, and said error signal; and
   wherein said auxiliary controller is a switching surface controller.

2. The extended switched-mode controller of claim 1, wherein said auxiliary feedback input signal is sampled by an analog-to-digital converter and said auxiliary controller is configured to operate digitally.

3. The extended switched-mode controller of claim 2, wherein said comparator is an analog-to-digital converter and said switched-mode controller is configured to operate digitally.

4. The extended switched-mode controller of claim 3, wherein said auxiliary controller is implemented as a state machine and said switched-mode controller is a constant-frequency digital pulse-width modulation ("PWM") controller.

5. The extended switched-mode controller of claim 1, wherein said feedback signal is representative of an output voltage at an output of the switched-mode power converter, wherein said reference signal is a reference voltage, and wherein said error signal is representative of the difference between said output voltage and said reference voltage.

6. The extended switched-mode controller of claim 1, wherein said switched-mode controller comprises at least one of: a current-mode controller, hysteretic controller, sliding-mode controller, a controller based on pulse-frequency modulation, and a controller utilizing a combination of these techniques.

7. The extended switched-mode controller of claim 4, wherein said switching surface controller comprises a switching surface that depends at least in part on said error signal and a capacitor current in said switched-mode power converter.

8. The extended switched-mode controller of claim 4, wherein said switching surface controller comprises a switching surface that depends at least in part on said error signal and output of a hybrid capacitor current estimator of a capacitor current in said switched-mode power converter.

9. The extended switched-mode controller of claim 8, wherein said hybrid capacitor current estimator comprises an input equal to said error signal, and at least one of: a finite difference filter, a moving average filter, and an integral estimator based on slopes of an inductor current in said switched-mode power converter.

10. The extended switched-mode controller of claim 8, wherein said hybrid capacitor current estimator comprises an input equal to said error signal, a finite difference filter, a moving average filter, and an integral estimator based on slopes of an inductor current in said switched-mode power converter.

11. The extended switched-mode controller of claim 1, wherein said switching surface controller is a nonlinear switching surface controller.

12. The extended switched-mode controller of claim 4, wherein said switching surface controller is a nonlinear switching surface controller.

13. An auxiliary controller for association with a standard switched-mode controller for controlling the switching of a switched-mode power converter during both non-transient and transient events, wherein the switched-mode power converter comprises at least one switch and at least one filter, and wherein the at least one filter comprises an inductor and an output capacitor, the auxiliary controller comprising:
   a standard control signal input configured to receive standard switch controls signals from the standard switched-mode controller;
   an auxiliary feedback input configured to receive an auxiliary feedback input signal comprising at least one of: sensed converter voltages, converter currents, and an error signal; and
   a switch control signal output configured to provide switch control signals to the switched-mode power converter, wherein said auxiliary controller is configured to receive said standard switch control signals from the standard switched-mode controller and based upon said auxiliary feedback input signal to (1) pass said standard switch control signals to the switched-mode power converter during non-transient mode operation, and (2) provide auxiliary switch control signals to the switched-mode power converter during transient mode operation instead of said standard switch control signals;
   wherein said auxiliary controller is further configured, to determine when to provide said auxiliary switch control signals and to determine what control signals to provide based at least in part on said auxiliary feedback input signal, and wherein said auxiliary controller is a switching surface controller.

14. The auxiliary controller of claim 13, wherein said auxiliary feedback input signal is based upon the difference between a reference voltage and an output voltage at an output of the switched-mode power converter.

15. The auxiliary controller of claim 13, wherein said auxiliary feedback signal is sampled by an analog-to-digital converter and said auxiliary controller is configured to operate digitally.

16. The auxiliary controller of claim 15, wherein said auxiliary controller is a state machine and said standard switched-mode controller is a constant-frequency digital pulse-width modulation ("PWM") controller.

17. The auxiliary controller of claim 16, wherein said switching surface controller comprises a switching surface that depends at least in part on said error signal and a capacitor current in said standard switched-mode power converter.

18. The auxiliary controller of claim 16, wherein said switching surface controller comprises a switching surface that depends at least in part on said error signal and output of a hybrid capacitor current estimator of a capacitor current in said standard switched-mode power converter.

19. The auxiliary controller of claim 18, wherein said hybrid capacitor current estimator comprises an input equal to said error signal, and at least one of: a finite difference filter, a moving average filter, an integral estimator based on slopes of an inductor current in said standard switched-mode power converter.

20. The auxiliary controller of claim 19, wherein said hybrid capacitor current estimator comprises an input equal to said error signal, a finite difference filter, a moving average filter, and an integral estimator based on slopes of an inductor current in said switched-mode power converter.

21. The auxiliary controller of claim 13, wherein said switching surface controller is a nonlinear switching surface controller.

22. The auxiliary controller of claim 16, wherein said switching surface controller is a nonlinear switching surface controller.

23. A switched-mode power converter system for controlling the switching of a switched-mode power converter during both non-transient and transient events, the switched-mode power converter system comprising:
   a switched-mode power converter comprising a first switch and a second switch and a converter output, wherein said output is configured to provide power to a load, wherein said switched-mode power converter comprises and at least one filter, and wherein said at least one filter comprises an inductor and an output capacitor;
   a comparator configured to receive a feedback signal from said converter output of said switched-mode power converter and to receive a reference signal; wherein said comparator is further configured to generate an error signal based at least in part on the difference between said feedback signal and said reference signal;
   a switched-mode controller configured to determine and generate standard switch control signals for the switched-mode power converter; and
   an auxiliary controller configured to receive said standard switch control signals from said switched-mode controller and to (1) pass said standard switch control signals to the switched-mode power converter during non-transient operation, and (2) provide auxiliary switch control signals to the switched-mode power converter during transient operation instead of said standard switch control signals;
   wherein said auxiliary controller is further configured to determine when to provide said auxiliary switch control signals and to determine what control signals to provide based at least in part on an auxiliary feedback input signal comprising at least one of: sensed converter voltages, converter currents, and said error signal; and wherein said auxiliary controller is a switching surface controller implemented as a state machine and employs capacitor current estimation.

24. The switched-mode power converter system of claim 23, wherein said feedback signal is representative of an output voltage at an output of the switched-mode power converter, wherein said reference signal is a reference voltage, and wherein said error signal is representative of the difference between said output voltage and said reference voltage.

25. The switched-mode power converter system of claim 23, wherein said switched-mode controller is a constant-frequency pulse-width modulation ("PWM") controller, and wherein said switched-mode controller comprises at least one of: a current-mode controller, hysteretic controller, sliding-mode controller, a controller based on pulse-frequency modulation, and a controller utilizing a combination of these techniques.

26. The switched-mode power converter system of claim 23, wherein said comparator is an analog-to-digital converter, said switched-mode controller is a constant-frequency digital pulse-width modulation (DPWM) controller, said auxiliary feedback input signal is said error signal.

27. A method for regulating voltage to a variable load, the method comprising the steps of:
   providing standard control signals to the switched-mode power converter during non-transient operation of the switched-mode power converter, wherein the standard control signals are based on feedback from the output of the switched-mode power converter, and wherein said standard control signals are derived based on at least one of the following types of controllers: constant-frequency pulse-width modulation (PWM) controller, current-mode controller, hysteretic controller, sliding-mode controller, a controller based on pulse-frequency modulation, and a controller utilizing a combination of these techniques; and overriding the standard control signals with auxiliary control signals during a transient event, wherein the determination of when to perform said overriding and wherein the determination of the values of said auxiliary control signals are based at least in part on an auxiliary feedback input signal comprising at least one of: sensed converter voltages, converter currents, and said error signal; and wherein the determination of when to perform said overriding is based upon evaluating whether a switching surface has been crossed.

28. A method for regulating voltage to a variable load, the method comprising the steps of:

evaluating whether a transient condition threshold has been reached and until said transient condition threshold has been reached continuing to pass control signals from a standard switched-mode controller to a switched-mode power converter, wherein said switched-mode power converter comprises at least one switch and at least one filter, and wherein the at least one filter comprises an inductor and an output capacitor;

upon determining that said transient condition threshold has been reached, evaluating whether a switching surface has been crossed and determining auxiliary control signals, wherein evaluating whether a switching surface has been crossed is performed using capacitor current estimation techniques, wherein said auxiliary control signals are determined to be one of $c=1$ and $c=0$, and wherein said determining of said auxiliary control signals is based on whether said transient condition threshold that was crossed was an upper or lower threshold;

replacing said control signals from said standard switched-mode controller with said determined auxiliary control signals and providing said auxiliary control signals to said at least one switch in said switched-mode power converter;

evaluating whether a non-transient condition threshold has been reached and (1) if the non-transient threshold has not been reached, repeating the steps of evaluating whether a switching surface has been crossed, determining auxiliary control signals, replacing said control signals from said standard switched-mode controller with said determined auxiliary control signals, and providing said auxiliary control signals to said at least one switch in said switched-mode power converter; and (2) if the non-transient threshold has been reached, reverting to passing said control signals from said standard switched-mode controller on to said switched-mode power converter.

* * * * *

UNITED STATES PATENT AND TRADEMARK OFFICE
CERTIFICATE OF CORRECTION

PATENT NO. : 8,319,486 B2
APPLICATION NO. : 12/139340
DATED : November 27, 2012
INVENTOR(S) : Dragan Maksimovic et al.

Page 1 of 1

It is certified that error appears in the above-identified patent and that said Letters Patent is hereby corrected as shown below:

In Column 15, line 32, the "," after the word "configured" is included in error and should be removed.

Signed and Sealed this
Nineteenth Day of February, 2013

Teresa Stanek Rea
*Acting Director of the United States Patent and Trademark Office*